April 13, 1943.   R. C. TOWNSEND   2,316,374
VEHICLE SUPPORTING TRUCK
Filed July 21, 1941   3 Sheets-Sheet 1

Inventor
ROY C. TOWNSEND

By Carlsen + Hagle

Attorneys

April 13, 1943.  R. C. TOWNSEND  2,316,374
VEHICLE SUPPORTING TRUCK
Filed July 21, 1941  3 Sheets-Sheet 2
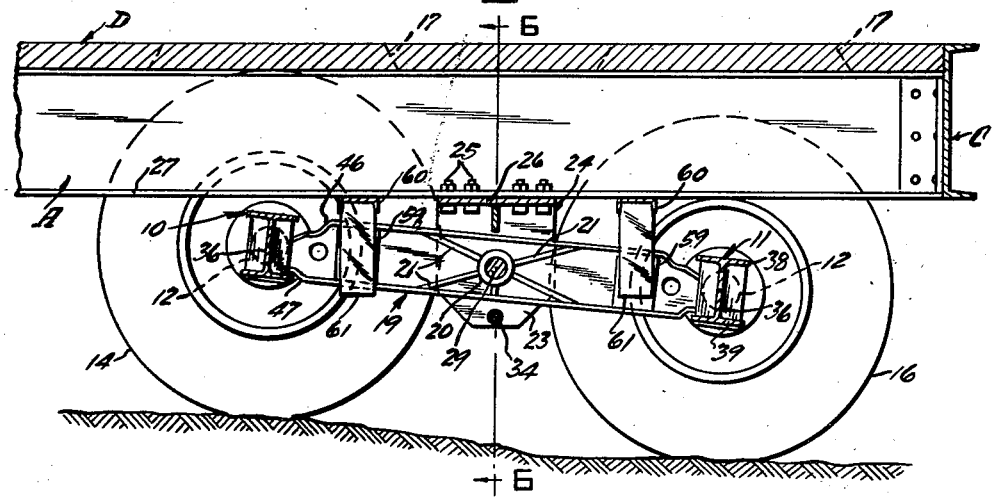
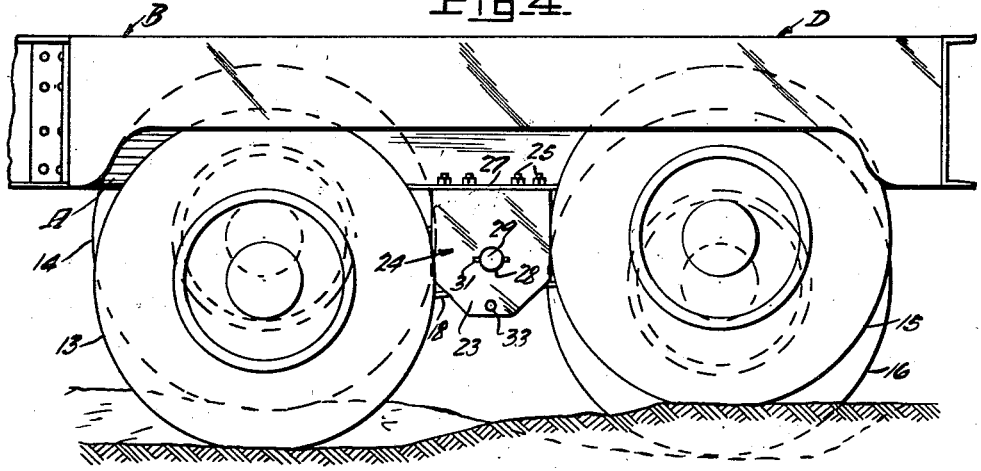
Inventor
ROY C. TOWNSEND
By Carlsen + Hagle
Attorneys

Patented Apr. 13, 1943

2,316,374

UNITED STATES PATENT OFFICE 2,316,374

VEHICLE SUPPORTING TRUCK

Roy C. Townsend, La Crosse, Wis.

Application July 21, 1941, Serial No. 403,443

7 Claims. (Cl. 280—111)

This invention relates to improvements in supporting trucks or wheel assemblies for vehicles.

The primary object of the invention is to provide a truck assembly embodying front and rear transversely spaced wheel pairs and means connecting the wheels for differential up and down movements to facilitate their travel over irregular surfaces. Another object is to provide a truck assembly of this kind in which the wheels may adjust themselves to travel over irregular surfaces while maintaining equal load distribution to each wheel at all times. A further object is to provide a truck assembly of this nature which includes bracing means, serving as a part of the operating and connecting mechanism, but also operating as torque arms to absorb braking stresses set up when the wheels are braked. Still a further object is to provide a truck assembly of this kind of rugged and structurally strong construction making it especially useful for use on heavy duty trailers and similar vehicles.

These and other more detailed and specific objects will be disclosed in the course of the following specification, reference being had to the accompanying drawings, in which—

Fig. 3 is a longitudinal vertical section through one side of the truck, removing the near truck wheels.

Fig. 4 is a side elevation.

Fig. 5 is a fragmentary elevational view of one axle end.

My invention is disclosed herein for example as applied to a heavy duty trailer of conventional construction embodying main longitudinal beams A, side members or plates B and cross members C, all rigidly braced and connected to support the platform D. At its forward end the trailer may be carried by a wheeled truck (not shown) of any desired form and at the rear end the truck assembly constituting my invention is employed as the main load supporting element of the trailer.

Figure 6:
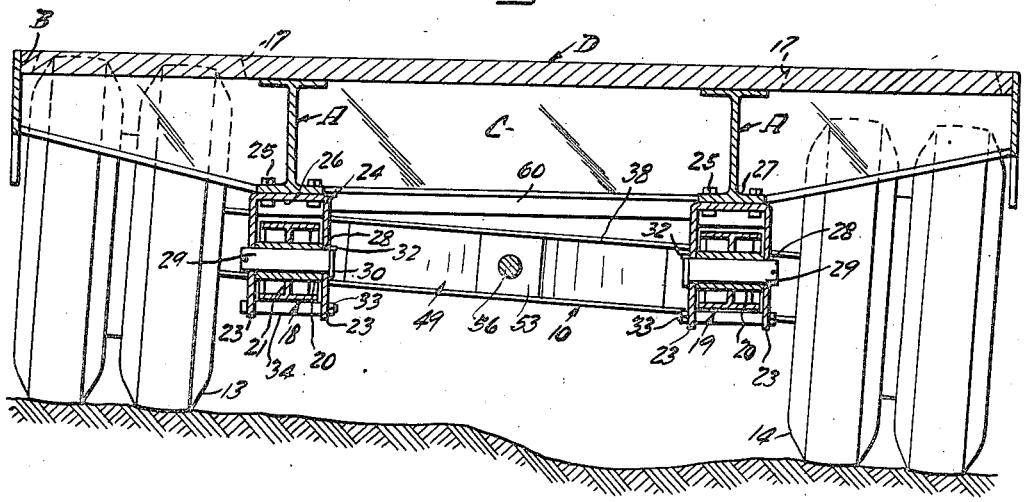
Fig. 6 is a vertical cross section along the line 6—6 in Fig. 3.

This truck assembly comprises tandem or spaced front and rear, transversely extending axles designated generally at 10 and 11 formed as here shown from structural I-beams and having spindles 12 secured rigidly at their ends to support the truck wheels. These spindles extend endwise and upon the front axle spindles the front wheels 13—14 are rotatably mounted while on the rear axle spindles the rear wheels 15—16 are similarly mounted. Each of said wheels may be a unit including dual tires as clearly shown and the length of the axles 10—11 is such that the wheels are disposed outwardly of the trailer beams A so that the tires or wheels may be readily removed at the sides of the trailer. Openings 17 are provided in the platform D above each wheel to permit upward movements of the wheels as seen in Fig. 6, and as will presently appear.

For connecting the axles to the vehicle I provide a pair of rocking bolsters or beams 18—19 arranged in longitudinally extending positions beneath the frame beams A and in alignment with end portions of the axles 10—11. Said bolsters are also here shown as formed of structural I-beams and intermediate their ends they are provided with transverse bearing sleeves 20 (Figs. 3 and 6) rigidly supported and braced by welded plates 21, through the upright webs 22 of the beams. The intermediate portions of the bolsters 18—19 are upwardly received between the parallel depending sides 23 of inverted U-shaped mounting members 24 which are secured beneath the beams A, as by bolts 25 passing through the bight portions 26 of the members and through the lower webs 27 of the beams A. The sides 23 have transversely aligned openings 28 adapted to register with the bearing sleeves 20 to receive the rocker pins 29 by which the bolsters are mounted for up and down movements at their front and rear ends about the transverse, horizontal axes of said pins. The rocker pins 29 are held in place at inner ends by heads 30 and at outer ends by keys 31, and are held against rotation by lugs 32 on the inner sides of the mounting members 24 engaging flattened portions of said heads 30.

The lower extremities of the sides 23 of said mounting members 24 are prevented from spreading under strain by cross bolts 33 which are drawn up tightly to bring the sides to bear against the ends of tubular sleeves 34 placed on the bolts as clearly shown.

Figures 1, 2:
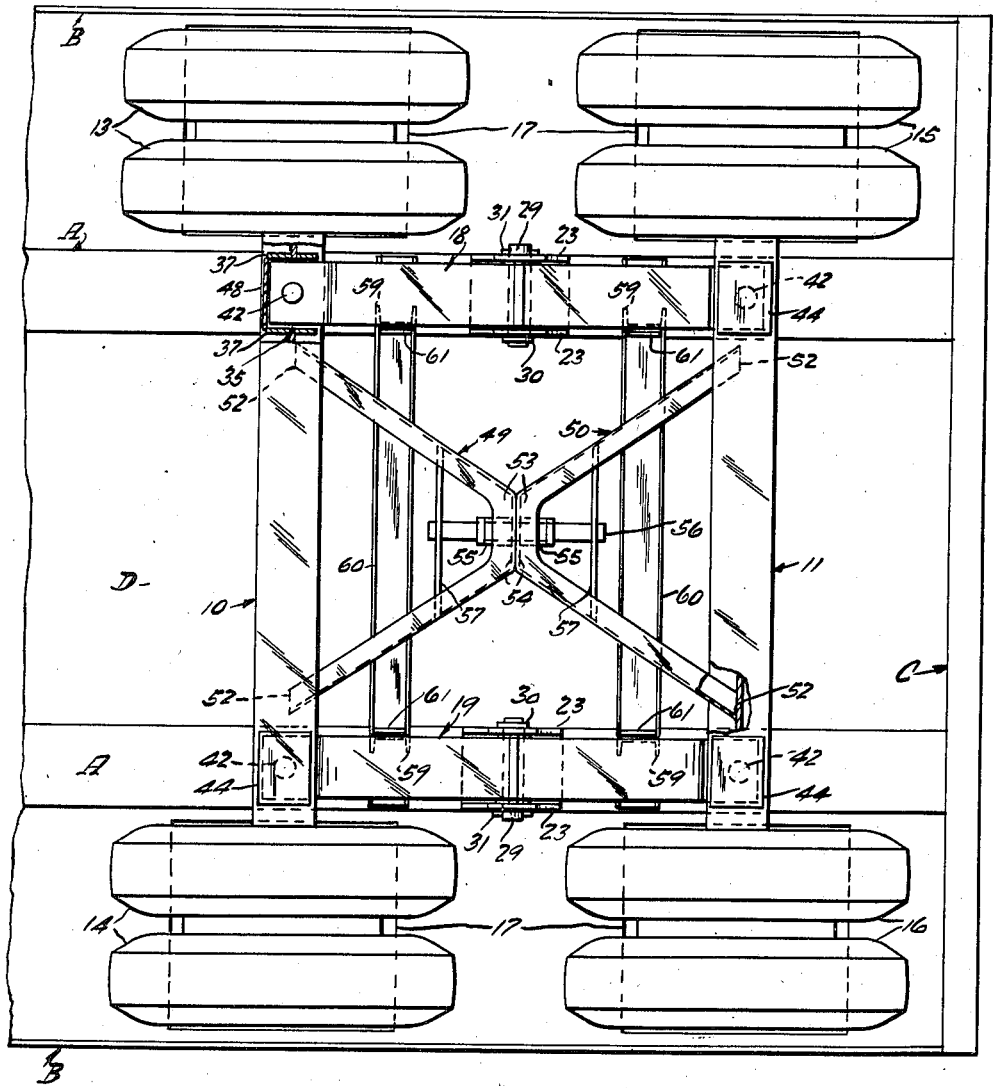
Fig. 1 is a bottom plan view of the rear end of a trailer equipped with the truck of my invention.
Fig. 2 is an enlarged fragmentary vertical and longitudinal sectional view showing one pivot connection between bolster and axle.

The length of the bolsters 18 and 19 is greater than the desired spacing between the tandem axles 10 and 11 and said axles therefore are provided with openings 35 in their upright webs 36 to loosely accommodate the respective front and rear ends of the bolsters. These openings 35 (Figs. 2 and 5) are defined at inner and outer ends by upright bracing plates 37 welded to the webs 36 and upper and lower flanges 38 and 39 of the axles and the lower flanges 39 support flat bearing plates 40 welded in place in said openings. The lower flanges 41 of the bolsters 18—19 are adapted to loosely overlie these bearing plates 40 and said flanges have downwardly turned bosses or stubs 42 adapted to loosely enter and fit into upwardly opening sockets 43 formed in the bearing plates and lower axle flanges 39. Cover plates 44 are welded (or removably mounted) below said flanges 39 to close the lower sides of the sockets 43 and may serve as bearings for the bosses 42 and slightly lift the bolsters clear of the bearing plates.

The ends of the bolsters are shaped to best fit the axles by angling the upper flanges 45 downwardly as shown at 46 and the end portions of the lower flanges 41 are offset upwardly somewhat as at 47 to accommodate the rise of the bearing plates 40 and permit the axles and bolsters to lie normally in about the same horizontal plane. The side plates 37 are connected by plates 48 welded at front and rear sides of the respective front and rear axles 10—11 to protect the connections between axles and bolsters.

Between their ends the axles 10 and 11 are connected together, independently of the vehicle and bolsters by connecting members or torque arms designated generally at 49 and 50. Each of said members 49—50 is of substantially V-shape having arms or sides 51 which are welded or otherwise secured at their widely spaced ends at 52 to facing sides of the axles 10—11 and from which the arms converge to bring their truncated apices or inner ends 53 into meeting and bearing engagement along a transverse and upright plane. In other words, the forward member 49 extends rearwardly from the front axle 10 and the rear member 50 extends forwardly from the rear axle 11, and both of said members lie in substantially the same general horizontal plane as that occupied by the axles themselves.

The members 49—50 are formed, as here shown, of structural channels and at their meeting and bearing ends 53 the upright webs 54 of the channels have openings aligned with bearing collars 55 welded to said webs to pivotally receive a longitudinally and horizontally extending connecting pin 56. Cross arms 57 welded between the arms 51 parallel with the ends 53 also are apertured to receive the ends of this pin 56 and provide a long effective bearing surface for the pin. Said pin 56 is located substantially intermediate the bolsters 18—19 and substantially in the same horizontal plane as the rocker pins 29.

In the operation of the structure as thus far described it will be apparent that the weight of the vehicle will be transmitted through the bolsters 18—19 and their pivotal connections with the axles 10 and 11 to the wheels 13 through 16. As any wheel meets an irregularity in the road surface it may, however, move freely upwardly or downwardly as the case may require, but due to the differential or compensating action, equal load distribution will be obtained to all wheels at all times, if the vehicle is properly loaded. For example if the front left wheel 13 (looking forwardly) meets a depression in the road surface (Fig. 4) it will drop downwardly a short distance rocking the bolster 18 downward at that end and raising the rear, left wheel 15 an equal distance thus equalizing the load distribution at that side. Should there be a transverse irregularity in the road surface (Fig. 6) either wheel may rise or fall at one side while the corresponding wheel at the other side moves oppositely to again compensate for such irregularity and maintain equal load distribution. In such operations the bolsters 18—19 rock up and down in longitudinal planes while the axles 10—11 rock up and down in transverse planes, so that extreme flexibility is possible as will be apparent. The pivotal connections between axles and bolsters, formed by the bosses 42 and sockets 43 permit pivotal movements in both longitudinal and transverse planes for this purpose.

In their rocking movement the axles 10—11, of course, oscillate about the longitudinal and horizontal axis of the connecting pin 56 and the torque arms 49—50 supporting said pin serve several distinct and useful purposes. They thus act chiefly as side or diagonal braces to maintain axle alignment and at the same time provide for the necessary universal action of the axles. The wheels 13 through 16 are however, as usual in such constructions, provided with individual brakes (not shown) and these arms thus serve also the very desirable function of absorbing the torsional stresses and resisting the braking power when such brakes are applied, thus protecting the assembly against distortion and facilitating braking action.

Figure 7:
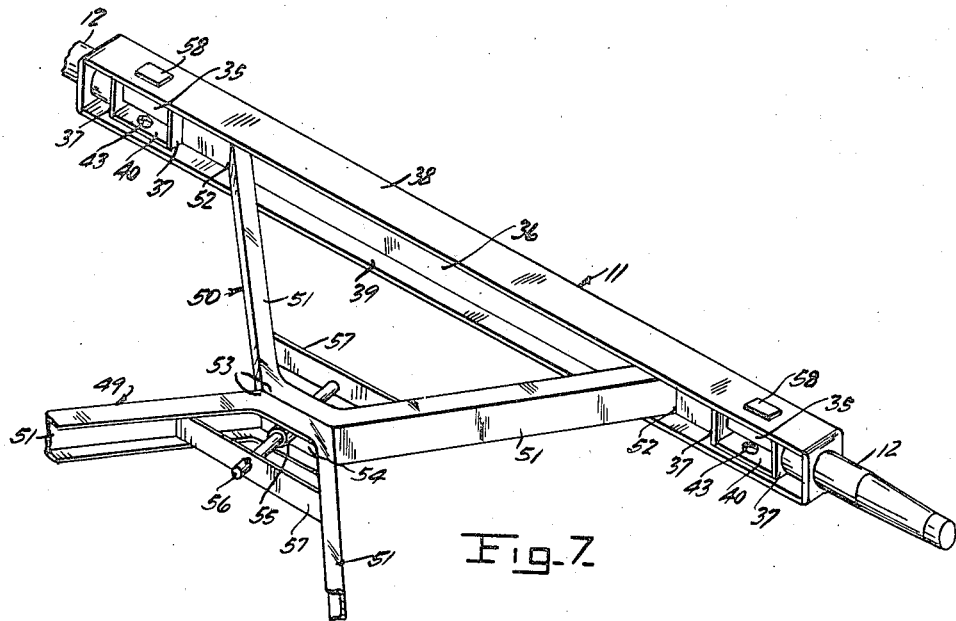
Fig. 7 is a perspective view of one axle and adjacent portions of the torque arms and connecting means.

The upward movements of the axle ends is limited, to such extreme that the wheels will never at any time strike the platform, by means of bumper pads 58 (Fig. 7) secured to upper sides of the axles 10—11 near their ends and in position to engage the undersides of the frame beams A if required.

It will be noted that the axles and bolsters effectively form and constitute the sides of a rectangle pivotally connected at the corners and wheel supported thereat. With two opposite sides (the bolsters 18—19 herein) fulcrumed to the vehicle it is apparent then that the wheel supported corners have complete freedom of interdependent and differential up and down movements, affording either transverse or longitudinal equalizing action, or both together, as required. The inclusion of the torque arms 49—50 then provides diagonal and side bracing such as to prevent distortion of the frame and providing complete flexibility without strain on any of the parts. Side thrust when turning sharp corners is positively resisted, and uniform axle loads are secured whether the vehicle is being braked, running up or down hill, or running over an extremely irregular road surface.

As an aid to resisting any possible misalignment due to side thrusts on the wheels, the bolsters 18—19 are provided with upright pads or guides in the form of channels 59 secured between upper and lower flanges 45 and 41 on inner sides and adjacent their front and rear ends. Cross beams 60 are secured transversely beneath the beams A immediately over the guides 59 and carry rigidly mounted upright guide plates 61 which hang downwardly a short distance inwardly of said guides. Should more than an extremely minor distortion now take place the guides 59 will contact the plates 61 to limit such movement without, however, in any way interfering with the normal up and down movements of the bolster ends.

Lubrication for the various pivotal connections at 29, 42 and 56 may be provided in any desired and suitable manner.

It is understood that suitable modifications may be made in the structure as disclosed, provided such modifications come within the spirit and scope of the appended claims. Having now therefore fully illustrated and described my invention, what I claim to be new and desire to protect by Letters Patent is:

1. In a vehicle, a pair of bolsters fulcrumed on transverse axes to the vehicle for up and down movements at front and rear ends, axles supportably engaging and connecting corresponding front and rear ends of each bolster, wheels on the axles, and torque members connecting the axles for relative pivotal movements in transverse upright planes, said torque members being pivotally connected at mutually supported adjacent ends.

2. A vehicle supporting truck assembly, comprising a pair of longitudinally extending bolsters fulcrumed on the vehicle for up and down movements at their opposite ends, transversely extending wheel supported axles supportably engaging the respective ends of the bolsters, said bolster ends having pivotal connections with said axles, and pivotally joined torque members connecting the axles for rocking movements about a horizontal and longitudinally extending axis, said torque members mutually supporting each other at their point of pivotal connection with each other.

3. A vehicle supporting truck comprising a pair of spaced longitudinally extending bolsters pivotally connected to the vehicle intermediate their ends on transversely extending axes, wheel supported tandem axles supportably engaging and connecting the respective front and rear ends of the bolsters, and mutually supported torque members pivotally connecting the said axles for movement about a horizontal and longitudinal axis located at a point between the said bolsters and in a horizontal plane passing through the said axles.

4. A vehicle truck assembly, comprising front and rear axles, wheels supporting the respective ends of each axle, means pivotally connecting the axles for up and down movements in transverse planes at their wheel supported ends and with respect to the vehicle, a pair of spaced bolster members pivotally and supportably connected to the vehicle for up and down movements in longitudinal planes adjacent the ends of the axles, and means pivotally connecting the adjacent end portions of the axles and bolster members permitting pivotal movements therebetween in both longitudinal and transverse planes.

5. A vehicle truck assembly comprising a pair of wheel supported tandem axles arranged for upward and downward movements in transverse planes at their wheel supported ends, bolsters fulcrumed on the vehicle for up and down movements in longitudinal planes at their ends and adjacent said wheel supported ends of the axles, the said axles having upwardly opening sockets, and depending pivot means on the bolster ends loosely and pivotally engaging the said sockets.

6. A vehicle truck assembly comprising a pair of wheel supported tandem axles arranged for upward and downward movements in transverse planes at their wheel supported ends, bolsters fulcrumed on the vehicle for up and down movements in longitudinal planes at their ends and adjacent said wheel supported ends of the axles, said axle ends having openings to loosely receive the ends of the bolsters, bearing plates having upwardly opening sockets, and bosses depended from the bolster ends and loosely and oscillatably engaging said sockets.

7. A vehicle truck assembly comprising a pair of transversely spaced and longitudinally extending bolsters fulcrumed on the vehicle for upward and downward movements at their front and rear ends, a front axle movably connected to the forward ends of the bolsters, a rear axle movably connected to the rear ends of the bolsters, ground wheels on the ends of the axles, opposed brace members secured to the axles and disposed between the bolsters, adjacent ends of the brace members being disposed in mutually supporting meeting engagement and being connected for relative rocking movements about a longitudinally and horizontally extending axis disposed in substantially the horizontal plane of the bolster fulcrums.

ROY C. TOWNSEND.